(12) United States Patent
Emerson et al.

(10) Patent No.: US 8,572,672 B2
(45) Date of Patent: Oct. 29, 2013

(54) MANAGEMENT OF DOCUMENT CONTENT PROCESSING USING BI-DIRECTIONAL COMMUNICATION

(75) Inventors: Daniel Emerson, Redmond, WA (US); Michael Bourgoin, Lake Forest Park, WA (US)

(73) Assignee: Microsoft Corporation, Redmond, WA (US)

( * ) Notice: Subject to any disclaimer, the term of this patent is extended or adjusted under 35 U.S.C. 154(b) by 2287 days.

(21) Appl. No.: 11/182,375

(22) Filed: Jul. 15, 2005

(65) Prior Publication Data
US 2007/0027979 A1 Feb. 1, 2007

(51) Int. Cl.
*H04L 29/06* (2006.01)
(52) U.S. Cl.
USPC ............................................................ 726/1
(58) Field of Classification Search
USPC ............ 726/1; 382/162; 358/1.1, 1.6, 1.9, 2.1
See application file for complete search history.

(56) References Cited

U.S. PATENT DOCUMENTS

| | | | |
|---|---|---|---|
| 6,571,009 B1 * | 5/2003 | Nielsen et al. | 382/162 |
| 2005/0030558 A1 * | 2/2005 | Wiechers et al. | 358/1.3 |
| 2005/0213132 A1 * | 9/2005 | Uejo | 358/1.13 |

* cited by examiner

*Primary Examiner* — Edward Zee
(74) *Attorney, Agent, or Firm* — Lee & Hayes, PLLC (57) ABSTRACT

Device and operational management using bi-directional communication can be performed by a system that includes a service requesting component that generates first metadata, and a service provider component that receives the first metadata and generates second metadata in response thereto for processing by the service requesting component. In other aspects, device and operational management can be performed by determining a status of a given management operation related to a given workflow relative to a given component, and communicating the status of the given management operation to another component that is downstream of the given component in the given workflow. This communication can prevent the other component from repeating the management operation, leading to erroneous results for the workflow.

18 Claims, 5 Drawing Sheets

MANAGEMENT OF DOCUMENT CONTENT PROCESSING USING BI-DIRECTIONAL COMMUNICATION

BACKGROUND

Color management refers to the process of associating abstract representations of colors with actual representations of colors as they are displayed on various devices. For example, in an image file containing a digital representation of a given object, respective sequences of binary digits may be assigned to represent various colors appearing in the image. The number of bits in the binary digits that represent the colors determine how many colors can be represented in the image. For example, assuming eight bits are allocated to storing color data in a given image file, the file can represent $2^8$, or 256 different colors. Further, the sequence 00h may represent a given shade of red, while the sequence 01h may represent a different shade of red, and so on.

In any event, the sequences are mere numbers devoid of any meaning, unless the numbers are mapped to corresponding color spaces by a color profile. Different devices or types of devices may be associated with different color spaces or color profiles. For example, display devices such as computer monitors or other cathode-ray tube (CRT) devices emit color as Red-Green-Blue (RGB) light, which is an additive color space. Printers or other devices that produced color output on inked paper typically use subtractive color spaces, such as Cyan-Magenta-Yellow-Black (CMYK) inks.

As an example, a color image file may be displayed on a CRT using an additive RGB color space. However, if that color image file is to be printed in a given color printer, the color printer would typically use a subtractive CMYK color space. Thus, it becomes appropriate to map the numerical values that define colors in the RGB color space for display on the CRT, to other colors in the CMYK color space for printing. This mapping or conversion process is one example of color management.

SUMMARY

Device and operational management using bi-directional communication can be performed by a system that includes a service requesting component that requests and receives first metadata from a service provider component, and then generates second metadata in response thereto for processing by the service provider component. In other aspects, device and operational management can be performed by determining a status of a given management operation related to a given workflow relative to a given component, and communicating the status of the given management operation to another component that is downstream of the given component in the given workflow. This communication can prevent the other component from repeating the management operation, leading to erroneous results for the workflow.

This Summary is provided to introduce a selection of concepts in a simplified form that are further described below in the Detailed Description. This Summary is not intended to identify key features to essential features of the claimed subject matter, nor is it intended to be used as an aid in determining the scope of the claimed subject matter.

BRIEF DESCRIPTION OF THE DRAWINGS

The same numbers are used throughout the drawings to reference like features and components. In the figures, the left-most digit(s) of a reference number identifies the figure in which the reference number first appears. The use of the same reference numbers in different figures indicates similar or identical items.

DETAILED DESCRIPTION

Figure 1:
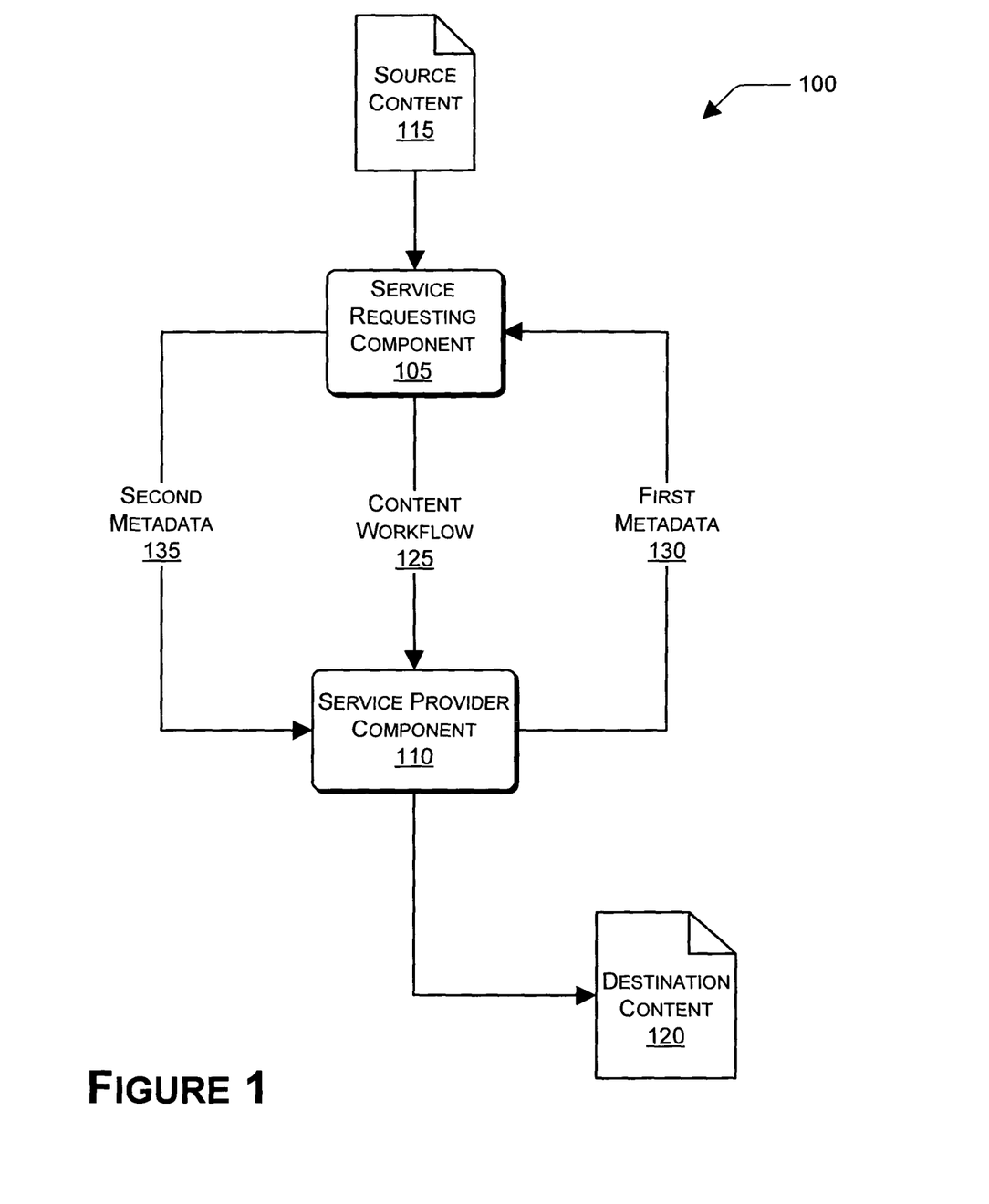
FIG. 1 is a block diagram of an architecture for performing color management using a bi-directional communications scheme between a service requesting component and a service provider component.

FIG. 1 illustrates an architecture 100 for performing color management using a bi-directional communications scheme between a service requesting component 105 and a service provider component 110. Source content 115 passes from the service requesting component 105 to the service provider component 110, which converts or transforms the source content 115 into corresponding destination content 120. A workflow 125 represents the transformation and processing of the source content 115. The bi-directional communications scheme can include the use of first metadata 130 that is requested by the service requesting component 105 and received from the service provider component 110. The bi-directional communications scheme can also include the use of at least second metadata 135 that is generated in response to the first metadata 130 and that passes from the service requesting component 105 to the service provider component 110.

The first and the second metadata 130 and 135 can relate to various aspects of converting the source content 115 into the destination content 120 as part of the workflow 125, as discussed in further detail below. For example, the service requesting component 105 may request the first metadata 130 to ascertain the capabilities of the service provider component 110. The service requesting component 105 can use the second metadata 135 to specify parameters related to the workflow 125 for the benefit of the service provider component 110. In turn, the service provider component 110 may use the first metadata 130 to report its capabilities to the service requesting component 105. The service provider component 110 can also extract one or more parameters related to the given workflow 125 from the second metadata 135.

The source content 115 may take, for example, digital or analog form. Analog forms of the source content 115 can include "hard" copies of the source content 115, for example, tangible representations that may be printed on paper. Digital forms of the source content 115 can include digital representations of the analog forms discussed previously. For example, scanners, fax machines, digital copies, cameras, and the like can scan analog documents and store digital representations thereof. However, digital forms of the source content 115 may also be received in digital form, and need not have originated in analog form.

The source content 115 may further be characterized as either color or black-and-white. The term "black-and-white" can include representations of various shades of gray, and this term is not limited to source content that includes only two colors (i.e., black and/or white). Instead, whether the source content 115 is characterized as color or black-and-white, the source content 115 may be represented in a variety of colors or black-and-white representations without limitation. In general, the foregoing discussion applies equally to the destination content 120.

The architecture 100 generally converts or transforms the source content 115 into destination content 120. As an illustrative but non-limiting example, the source content 115 may be a document that is scanned into a fax machine or scanner. Another example might be a color image of an object that is displayed on a computer monitor, or the like. The destination content 120 may be the scanned document as it is rendered on a computer monitor, in the first example, or the color image of the object as rendered in color hardcopy on a printer, in the second example.

Figure 2:
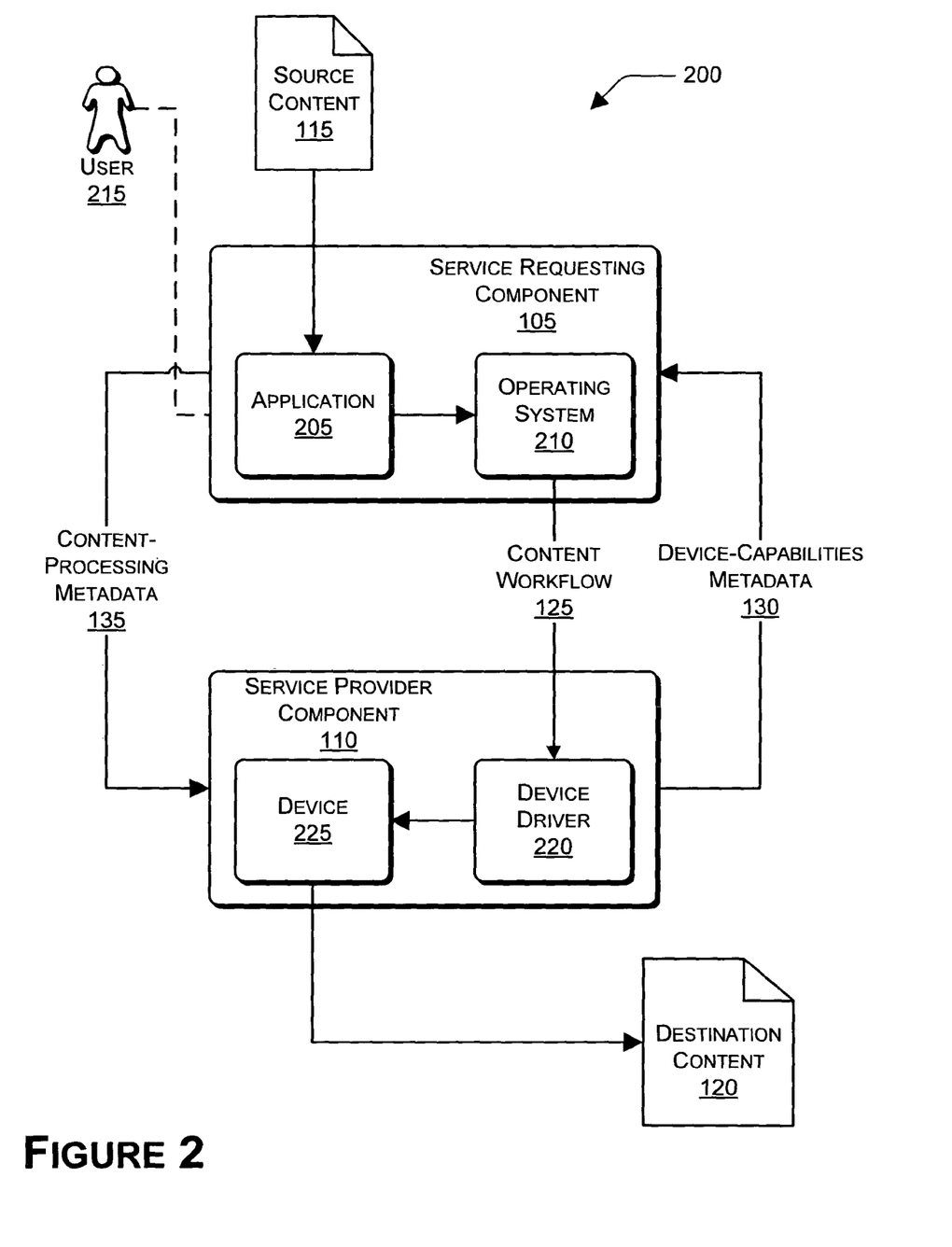
FIG. 2 is a block diagram of an architecture that builds further upon the architecture shown in FIG. 1.

FIG. 2 illustrates an architecture 200 that builds further upon the architecture 100 shown in FIG. 1. Reference numbers appearing in both FIGS. 1 and 2 refer to identical or similar subject matter. The service requesting component 105 is shown in FIG. 2 to include an application 205 and an operating system 210. A user 215 can employ the application 205 to view, edit, or other interact with the source content 115. As a non-limiting example, the application 205 may be an image editing or viewing program that enables the user 215 view a color image, edit it as appropriate, and print color hardcopy on a printer. The operating system 210 may be any operating system available to enable the user 215 and/or the application 205 to access and utilize the resources of a given computing environment, discussed in further detail below in connection with FIG. 5. A suitable, but non-limiting, example of the operating system 210 is any one of the WINDOWS® family of operating systems available from Microsoft Corporation of Redmond, Wash.

As shown in FIG. 2, the service provider component 110 includes a device driver 220 and a device 225. The device driver 220 can be implemented as a software component that enables the user 215, the application 205, and/or the operating system 210 to access or utilize the device 225. Generally, the device 225 is used in connection with producing the destination content 120 from the source content 115. When the user 215 wishes to utilize the device 225, for example, to print the color image in the above example, the user 215 so directs the application 205. The application 205, in turn, sends a print request to or through the operating system 210. The operating system 210 then causes the device driver 220 to be loaded or initialized, and then executed. As part of its execution, the device driver 220 may present, or cause the application 205 to present, a user interface that enables the user 215 to select certain options or parameters relating to creating the destination content 120. In response to the processing performed by the architectures 100 and 200 and related processing described herein, the user interface may be modified if certain options or parameters related to the workflow 125 become available or unavailable.

As shown in FIG. 2, the metadata 130 can take the form of device-capabilities metadata 130, which provides a mechanism by which the service provider component 110 can send capabilities information to the service requesting component 105. In a non-limiting context of printing, the device-capabilities metadata 130 may be referred to as PrintCapabilities 130. Also, the metadata 135 can take the form of content-processing metadata 135, which provides a mechanism by which the service requesting component 105 can send information to the service provider component 110 that governs the processing of a given content workflow 125. In a non-limiting context of printing, the content-processing metadata 135 may be referred to as PrintTicket 135. The terms "Print-Capabilities" and "PrintTicket" are used herein only for convenience of discussion and illustration, and do not limit the device 225 to be a printer or other such device. Instead, the architectures 100 and 200 shown herein can be employed to perform or coordinate activities in addition to printing.

The device-capabilities metadata 130 and the content-processing metadata 135 provide a bi-directional communications capability between the service requesting component 105 and the service provider component 110. First, this bi-directional communications capability enables applications 205 and/or operating systems 210 to control color processing for a given workflow 125, and to specify what (if any) color processing has been or is to be done in connection with the given workflow 125. Second, this bi-directional communications capability enables devices 225 and/or device drivers 220 to extensibly and consistently express both static color capabilities and dynamic color capabilities to the operating system 210 and/or the application 205. Static color capabilities refer to the color spaces supported by the device driver 220 and/or device 225, while dynamic color capabilities refer to a best color conversion that is possible based on a given or specified configuration of the device 225. Third, this bi-directional communications capability enables integrated expression of color processing control and capabilities in a general setting, and further enables standardized, end-to-end communications of the same between applications 205 and devices 225.

As a non-limiting example, the architectures 100 and 200 can be applied to color management in the context of printing. The architectures 100 and 200 enable applications 205 running on a given operating system platform to turn-off or otherwise disable color management in the operating system 210, to specify that color management should be performed by the device driver 220, and/or to specify that color management should be performed by the device 225 in a consistent or verifiable manner. Conventional architectures may not enable the application 205 to perform color management and then communicate that fact to components downstream in the workflow 125, such as the operating system 210, the device driver 220, or the device 225. Thus, these downstream components are not aware that color management has been done, and may repeat the color management on the workflow 125, leading to erroneous results when converting the source content 115 to the destination content 120. This scenario is referred to herein as "double color management" of color data.

The architectures taught herein avoid "double color management" by enabling upstream components, such as those included in the service requesting component 105, to notify downstream components of the status of color management. More particularly, the upstream components can indicate to the downstream components whether color management has been done by the upstream components, thereby indicating that the downstream components should not perform color management. In addition, the upstream component can communicate information on the parameters used in the performing the color management to the downstream components. As at least one alternative, if the upstream components elect not to perform color management, the upstream components can designate which downstream component should perform color management.

The architectures 100 and 200 can communicate color profiles, color processing capabilities, and/or intent information in an extensible manner that can be consistently understood by all components handling a given workflow 125. Using the architectures 100 and 200, the applications 205 can request or retrieve the color processing capabilities of a device 225, for example, a printer, by using the device-capabilities metadata 130. In turn, the applications 205 can use the content-processing metadata 135 to express color processing selections defined by either the application 205 and/or the user 215. Downstream components that receive the given workflow 125 and related content-processing metadata 135 can extract or retrieve parameters related to such color processing selections from the metadata 135.

Capabilities and processing information can be communicated using the metadata 130 and/or 135 between different types of devices 225, which can include, for example, displays or monitors, scanners, fax machines, digital copiers, cameras, and the like. Consistent use of the architectures 100 and/or 200 across a given workflow 125 can allow for unambiguous determination and control of color management responsibilities among the applications 205, the operating system 210, the device driver 220, and devices 225. The latter may take the form of, for example, imaging or printing devices 225.

It is noted that while an example implementation is described herein in the context of device 225 in the form of a printer and related device drivers 220, the teachings herein can be applied in the context of any application 205, any operating system 210, any device driver 220, and/or any device 225 that communicates, processes, and/or interprets color-related data.

Figure 3:
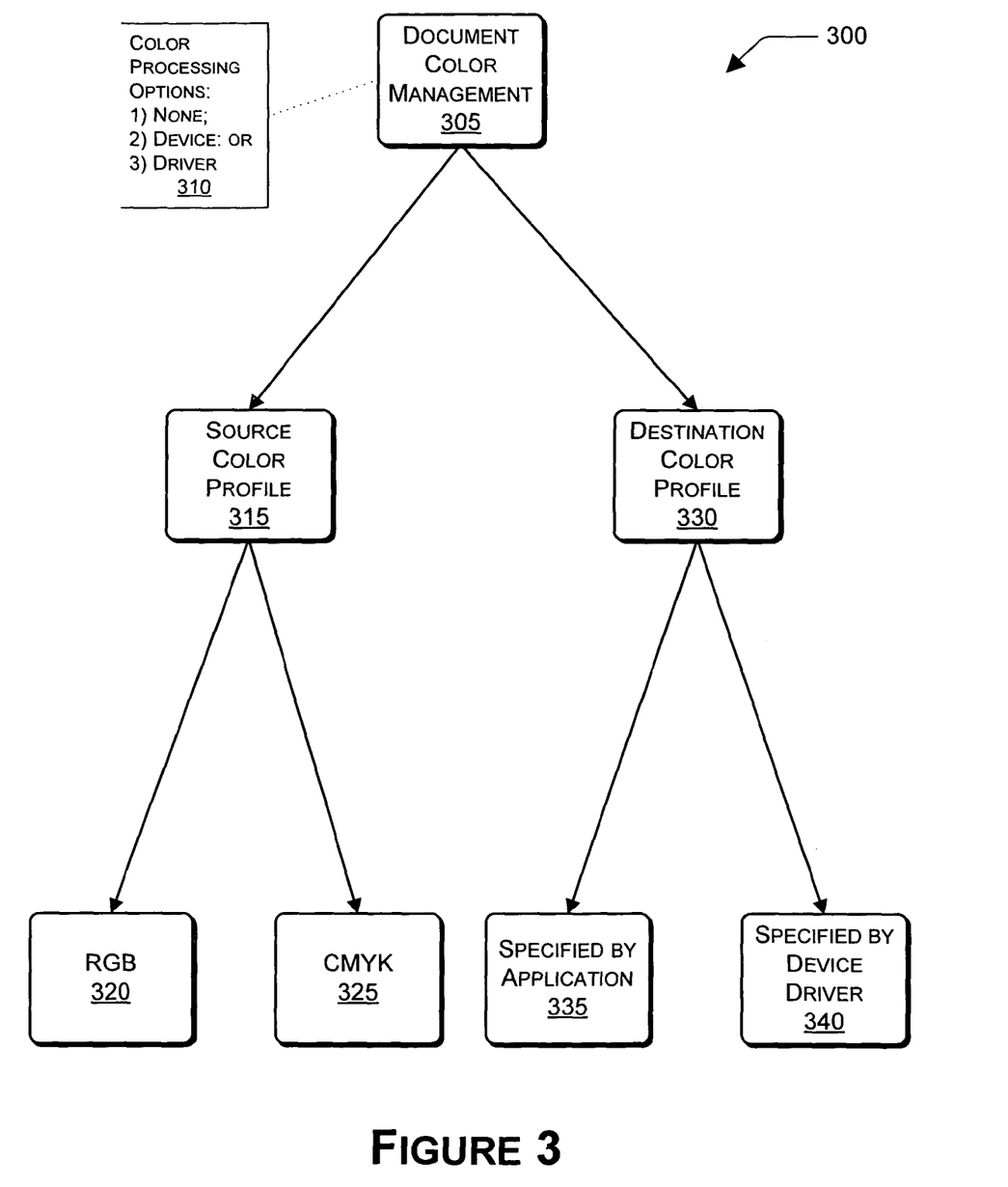
FIG. 3 is a block diagram of an extensible, multi-level hierarchy that may be defined by a schema suitable for instantiating the metadata shown in FIGS. 1 and 2 above.

FIG. 3 illustrates an extensible, multi-level hierarchy 300 that may be defined by a schema suitable for implementing the metadata 130 and/or 135 shown in FIGS. 1 and 2 above. Recall that the metadata 130 and/or 135 facilitates communicating the capabilities of devices 225 and the settings for particular workflows 125 allocated to those devices 225. The hierarchy 300 shown in FIG. 3 may be defined by an XML schema. More particularly, this XML schema can define one or more color processing keywords that support instances of the device-capabilities metadata 130 and the content-processing metadata 135. These keywords can be defined and extended by any implementation of the device 225 or the device driver 220 to describe the capabilities of the device 225 and/or device driver 220, for example, in the form of the device-capabilities metadata 130. The keywords may also be instantiated by any application 205 or operating system 210 for communication of color processing instructions to components involved in processing a workflow 125, components of an operating system 210, device drivers 220, or devices 225, for example, in the form of content-processing metadata 135.

An illustrative list of keywords is discussed in connection with FIG. 3, and defined by the sample XML code provided below. A Document Color Management keyword 305 enables the description of color management capabilities supported by the device driver 220 and/or device 225. The Document Color Management keyword 305 also describes the color management settings that can be defined by the application 205. The Document Color Management keyword 305 can be defined as an XML schema Feature with an enumerated list of processing Options and two additional child Features, as set out in the XML code below. The "Document" prefix refers to the scoping capability of the hierarchy 300, indicating this feature is applicable to documents in a content hierarchy, which can include an entire job that can include one or more documents, one or more pages within one or more documents, or a portion of a page.

As detailed in block 310, the options can specify whether the application 205 or the user 215 has performed color management. The "None" option enables the application 205 to inform all downstream components (i.e., the operating system 210, the device driver 220, and/or the device 225) that no additional color management should be performed, since the application 205 has already done so. Alternatively, this option can notify downstream components that no color management is desired. This option thus addresses the "double color management" issue described above. The "Device" option specifies that color management should be done in the device 225 itself. The "Driver" option specifies that color processing should be done in the device driver 220 before sending the workflow 125 to the device 225. Other implementations may offer some or all of the foregoing illustrative options, or can add other options depending on the functionality of particular devices 225 and/or related device drivers 220.

A Source Color Profile child feature 315 enables all components in a workflow 125 to be informed of the color characteristics of the source content 115 before color management occurs. The Source Color Profile child feature 315 is associated with at least two options for color profile types. For example, FIG. 3 illustrates a first option 320 for RGB, and at least a second option 325 for CMYK. The options 320 and 325 can describe a source color profile type that may be selected by the application 205 or the user 215.

The Source Color Profile child feature 315 can also provide a reference to color profile data. This reference may be a URL to an external definition, or a pointer to an element, such as a ParameterInit element, that defines the color profile within the content-processing metadata 135 itself. The "RGB" profile type 320 can indicate that the color profile of the source content 115 is untagged RGB color data, while the "CYMK" profile type 325 can indicate that the color profile of the source content 115 is untagged CMYK color data. Other implementations of the foregoing may offer some or all of these options, or may add other options dependent on the functionality of particular devices 225 and/or related device drivers 220.

Destination Color Profile child feature 330 defines how a color profile of the destination content 120 is specified. A destination color profile may be associated with the workflow 125, and specifies what color profile is used in converting the source content 115 to the destination content 120. The Destination Color Profile child feature 330 can be associated with at least two options. In a first option 335, the destination color profile is selected by the application 205 and/or the user 215. This "Application" option 335 indicates that the application 205 has already performed the color management and defined the resulting destination color profile. This option 335 thus provides the ability to specify this color profile data through the workflow 125.

In at least a second option 340, the application 205 and/or the user 215 does not specify the destination color profile, and instead may request that the device driver 220 select the destination color profile that is most appropriate. This "Driver Configuration" option 340 indicates that the application 205 or user 215 has requested a "best match" color profile based on the current configuration of the device 225. This option 340 enables the implementation of "user intent" in managing color data. "User intent" as used herein refers to, for example, rendering intent, saturation intent, or colorimetric intent (absolute or relative), or other types of intent, as those terms are known in the art.

The Destination Color Profile child feature 330 can also contain a reference to the color profile data. This reference can be either a pointer to an external definition of the color profile data, or the color profile data color profile data can be embedded in the content-processing metadata 135. As above, other implementations of the foregoing may offer some or all of these options, or may add other options dependent on the functionality of particular devices 225 and/or related device drivers 220.

Below is an illustrative sample of XML corresponding to the foregoing:

```xml
<!-- Configure color management for the current document. -->
<psf:Feature name="psk:DocumentColorManagement">
    <psf:Property name="SelectionType">
        <psf:Value
            xsi:type="xs:string">PickOne</psf:Value>
    </psf:Property>
    <!-- Color management has already been performed. -->
    <psf:Option name="psk:None"/>
    <!-- Color management should be performed by the device. -->
    <psf:Option name="psk:Device" />
    <!-- Color management should be performed by the driver. -->
    <psf:Option name="psk:Driver" />
    <!-- Driver may provide any additional color management
    methods as private
Options here. -->
    <!-- Define the characteristics of the source color profile. -->
    <psf:Feature name="psk:SourceColorProfile">
        <psf:Option name="psk:RGB">
            <!-- Source profile used to perform color
            management for untagged RGB
data. -->
            <psf:ScoredProperty name="psk:SourceColorProfile">
                <psf:ParameterRef
                    name="psk:DocumentSourceColorProfile" />
            </psf:ScoredProperty>
        </psf:Option>
        <psf:Option name="psk:CMYK">
            <!-- Source profile used to perform color
            management for untagged CMYK
data. -->
            <psf:ScoredProperty name="psk:SourceColorProfile">
                <psf:ParameterRef
                    name="psk:DocumentSourceColorProfile" />
            </psf:ScoredProperty>
        </psf:Option>
    <!-- Define the characteristics of the destination color profile. -->
    <psf:Feature name="psk:DestinationColorProfile">
        <!-- Application specifies the destination profile
        to be used. -->
        <psf:Option name="psk:Application">
            <!-- Destination profile used to perform color
            management. -->
            <psf:ScoredProperty
                name="psk:DestinationColorProfile">
                <psf:ParameterRef
                    name="psk:DocumentDestinationColorProfile" />
            </psf:ScoredProperty>
        </psf:Option>
        <!-- Driver selects the destination profile that best
        matches the its
current configuration. -->
        <psf:Option name="psk:DriverConfiguration">
            <!-- Destination profile used to perform color management. -->
            <psf:ScoredProperty
                name="psk:DestinationColorProfile">
                <psf:ParameterRef
                    name="psk:DocumentDestinationColorProfile" />
            </psf:ScoredProperty>
        </psf:Option>
        <!-- Driver may provide a list of any additional color
        profiles it
supports as private Options here. -->
</psf:Feature>
```

Color Profile Properties

The keywords as defined herein can also enable the device driver 220 to communicate the best color profile based on the current configuration of the device 225. This capability allows applications 205 to have insight into the color profiles supported by, or optimal for, the device driver 220 and/or the device 225. This capability can further enable the application 205 more intelligently to generate content-processing metadata 135 and to control color management.

The Document Color Management keyword 305 can define at least two Properties, which are named CMYKDestinationColorProfile and RGBDestinationColorProfile for convenience but not limitation. When an application 205 requests device-capabilities metadata 130, the device driver 220 may include either a path to or embed the data for the optimal RGB/CMYK color profile, given the current configuration of the device 225. These Properties can be applicable at least to the device-capabilities metadata 130. The application 205 may receive these properties as device-capabilities metadata 130. The application 205 may further interpret or directly embed these color profiles into the Document Color Management keyword 305 to instantiate the content-processing metadata 135, which can be used to communicate the profile data to the device driver 220 and/or device 225. Other implementations may expose other profile types based on the capabilities of the device driver 220 and/or the device 225.

Sample XML defining the foregoing is provided as follows:

```xml
<!-- Driver supplied property specifying the optimal RGB color
profile given the current device configuration. Application
must specify this information via the DocumentColorManagement
keyword. -->
<psf:Property name="psk:RGBDestinationColorProfile">
    <!-- File path to the profile. -->
    <psf:Property name="psk:Path">
        <Value xsi:type="xs:string">0</Value>
        <!-- undefined -->
    </psf:Property>
    <!-- Profile data content. -->
    <psf:Property name="psk:ProfileData">
        <Value xsi:type="xs:string">0</Value>
        <!-- undefined -->
    </psf:Property>
</psf:Property>
<!-- Driver supplied property specifying the optimal CMYK
color profile given the current device configuration.
Application must specify this information via the
DocumentColorManagement keyword. -->
<psf:Property name="psk:CMYKDestinationColorProfile">
    <!-- File path to the profile. -->
    <psf:Property name="psk:Path">
        <Value xsi:type="xs:string">0</Value>
        <!-- undefined -->
    </psf:Property>
    <!-- Profile data content. -->
    <psf:Property name="psk:ProfileData">
        <Value xsi:type="xs:string">0</Value>
        <!-- undefined -->
    </psf:Property>
</psf:Property>
```

The Document Color Management keyword 305 as defined above can provide the basis for instantiations of the content-processing metadata 135 and the device-capabilities metadata 130, as now discussed in more detail. First, a sample XML structure defining the device-capabilities metadata 130 as generated by the service provider component 110 and transmitted to the service requesting component 105 is given as follows:

```xml
<psf:PrintCapabilities>
    <!-- Non-color content ... -->
<!-- Configure color management for the current document. -->
<psf:Feature name="psk:DocumentColorManagement">
    <psf:Property name="SelectionType>
        <psf:Value
            xsi:type="xs:string">PickOne</psf:Value>
        </psf:Property>
    <!-- Color management has already been performed. -->
    <psf:Option name="psk:None"/>
    <!-- Color management should be performed by the device. -
NOT SUPPORTED -
->
    <!-- Color management should be performed by the driver. -->
    <psf:Option name="psk:Driver" />
    <!-- Define the characteristics of the source color profile. -->
    <psf:Feature name="psk:SourceColorProfile">
        <psf:Option name="psk:RGB">
            <!-- Source profile used to perform color management
                for untagged RGB
data. -->
            <psf:ScoredProperty
                name="psk:SourceColorProfile">
                <psf:ParameterRef
                    name="psk:DocumentSourceColorProfile" />
                </psf:ScoredProperty>
            </psf:Option>
        <psf:Option name="psk:CMYK">
            <!-- Source profile used to perform color management
                for untagged CMYK
data. -->
            <psf:ScoredProperty name="psk:SourceColorProfile">
                <psf:ParameterRef
                    name="psk:DocumentSourceColorProfile" />
                </psf:ScoredProperty>
            </psf:Option>
        </psf:Feature>
    <!-- Define the characteristics of the destination color
profile. -->
    <psf:Feature name="psk:DestinationColorProfile">
        <!-- Application specifies the destination profile to
            be used. -->
        <psf:Option name="psk:Application">
            <!-- Destination profile used to perform color
                management. -->
            <psf:ScoredProperty
                name="psk:DestinationColorProfile">
                <psf:ParameterRef
                    name="psk:DocumentDestinationColorProfile" />
                </psf:ScoredProperty>
            </psf:Option>
        <!-- Driver selects the destination profile that best
            matches the its
current configuration. -->
        <psf:Option name="psk:DriverConfiguration">
            <!-- Destination profile used to perform color
                management. -->
            <psf:ScoredProperty
                name="psk:DestinationColorProfile">
                <psf:ParameterRef
                    name="psk:DocumentDestinationColorProfile" />
                </psf:ScoredProperty>
            </psf:Option>
        <!-- Driver proprietary option. -->
        <psf:Option
            name="driverprivatenamespace:VendorSpecificProcessing">
            <!-- Destination profile used to perform color
                management. -->
            <psf:ScoredProperty
                name="psk:DestinationColorProfile">
                <psf:ParameterRef
                    name="psk:DocumentDestinationColorProfile" />
                </psf:ScoredProperty>
            </psf:Option>
        </psf:Feature>
    </psf:Feature>
        </psf:PrintCapabilities>
```

A sample of the content-processing metadata 135 as may be generated by the application 205 is given in XML as indicated below. The content-processing metadata 135 can be based on the device-capabilities metadata 130, as discussed above and elsewhere herein. This sample XML specifies that the device driver 220 should perform the color management, that the color profile of the source content 115 was RGB, and that the color profile of the destination content 120 should be the best as determined by the device driver 220.

```xml
<psf:PrintTicket>
    <!-- Non-color content ... -->
<!-- Configure color management for the current document. -->
<psf:Feature name="psk:DocumentColorManagement">
    <!-- Color management should be performed by the driver. -->
    <psf:Option name="psk:Driver" />
    <!-- Driver may provide any additional color management
        methods as private
Options here. -->
    <!-- Define the characteristics of the source color profile. -->
    <psf:Feature name="psk:SourceColorProfile">
        <psf:Option name="psk:RGB">
            <!-- Source profile used to perform color management
                for untagged RGB
data. -->
            <psf:ScoredProperty name="psk:SourceColorProfile">
                <psf:ParameterRef
                    name="psk:DocumentSourceColorProfile" />
                </psf:ScoredProperty>
            </psf:Option>
        </psf:Feature>
    <!-- Color Profile Data -->
    <psf:ParameterInit name="psk:DocumentSourceColorProfile">
        <psf:Value> COLOR PROFILE DATA GOES HERE
        </psf:Value>
        </psf:ParameterInit>
    <!-- Define the characteristics of the destination color profile. -->
    <psf:Feature name="psk:DestinationColorProfile">
        <!-- Driver selects the destination profile that best matches
its current configuration. -->
        <psf:Option name="psk:DriverConfiguration">
            <!-- Destination profile used to perform color
                management. -->
            <psf:ScoredProperty
                name="psk:DestinationColorProfile">
                <psf:ParameterRef
                    name="psk:DocumentDestinationColorProfile" />
                </psf:ScoredProperty>
            </psf:Option>
        </psf:Feature>
</psf:Feature>
        </psf:PrintTicket>
```

Figure 4:
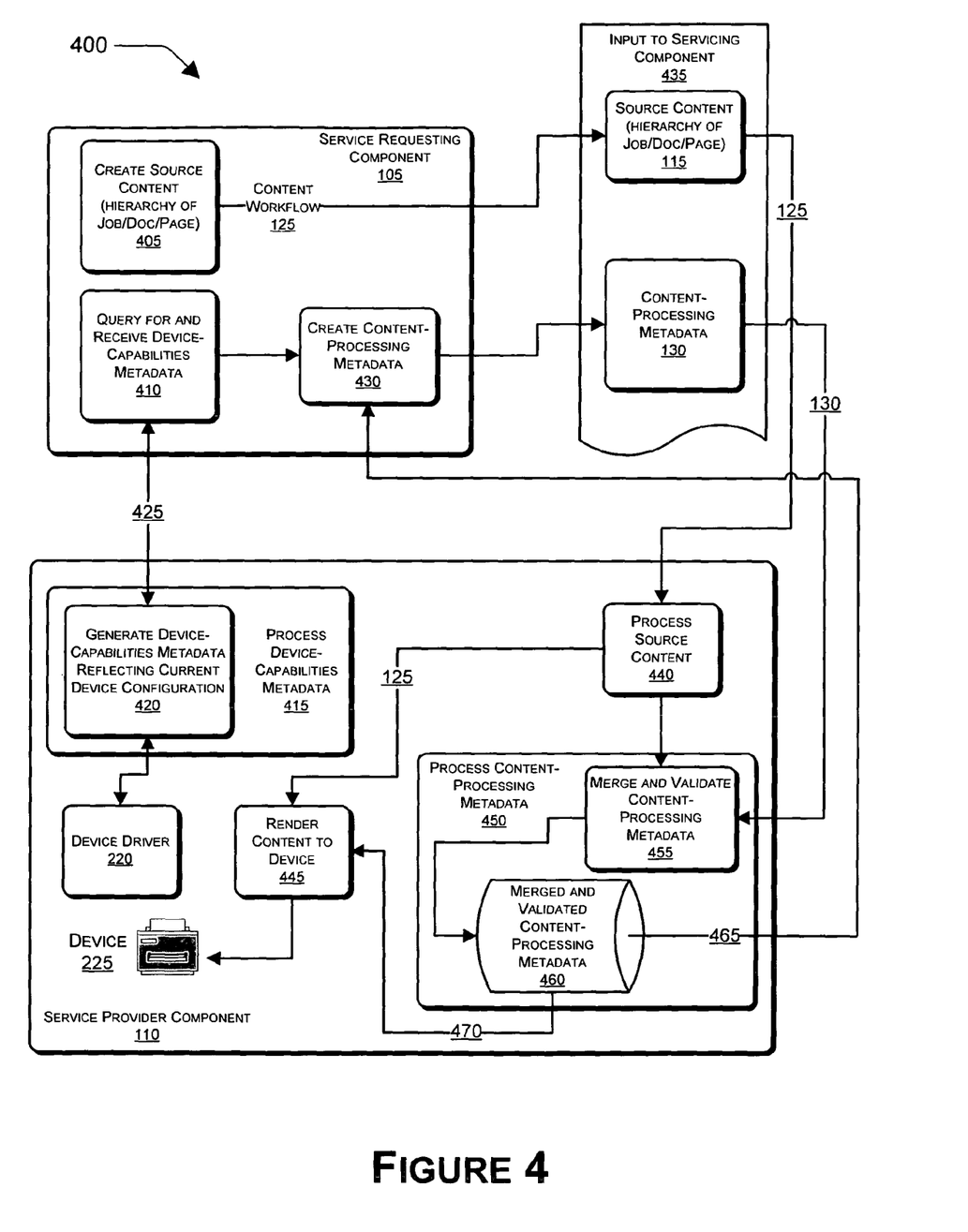
FIG. 4 is a combined block and process flow diagram of an implementation of the subject matter described herein, in the context of a printer driver.

FIG. 4 illustrates an implementation 400 of the subject matter described herein in the illustrative but non-limiting context of a printer driver. Also, while certain processes are described in the context of the architectures 100 and 200 described above, it is understood that these processes may be implemented in the context of other architectures without departing from the scope and spirit of the subject matter claimed herein.

Within the service requesting component 105, a process 405 (such as the application 205) creates the source content 115. The latter may be associated with the job/document/page hierarchy 300 described above. Also, a process 410 in the service requesting component 105 can query for and receive the capabilities of the device 225 to which or for which the source content 115 is being converted or transformed into destination content 120. This query can be transmitted to the service provider component 110 as a request for device-capabilities metadata 130, and received by a process 420 that handles such requests in the service provider component 110. This process 420 can generate the device-capabilities metadata 130 in response to this request, possibly by querying the device driver 220. This process 420 returns this metadata 130 to the service requesting component 105. For clarity and legibility, line 425 in FIG. 4 represents both the request for the device-capabilities metadata 130 and the metadata 130 formulated in response thereto.

Having received the device-capabilities metadata 130, a process 430 within the service requesting component 105 can formulate further content-processing metadata 135 in response thereto. This process 430 can forward the same as input 435 to the service provider component 110, along with the content workflow 125 relating to the given source content 115. The input 435 can include the source content 115 and the content-processing metadata 135 related thereto, both of which are output from the service requesting component 105.

Within the service provider component 110, a process 440 can receive the content workflow 125 representing the source content 115. In due course, the process 440 forwards the workflow 125 to a process 445 that renders the source content 115 onto the device 225 as destination content 120. While FIG. 4 depicts the device 225 as a printer for convenience, the device 225 need not be a printer in all implementations of the teachings herein. For example, the source content 115 may take the form of an image file profiled by a RGB color space, and the destination content 120 may take the form of a color hardcopy profiled by a CMYK color space, with the process 445 mapping various colors in the input RGB color space to colors in the CMYK color space.

Turning to the content-processing metadata 130, a process 450 within the service provider component 110 can include process 455 that receives the content-processing metadata 135, validates it, and merges or associates it with the workflow data 125 to which the content-processing metadata 135 corresponds. More particularly, the content-processing metadata 135, as submitted by the service requesting component 105, is validated against the device-capabilities metadata 130 applicable to the given device 225. The merged workflow data 125 and corresponding content-processing metadata 135 can be stored in a data structure 460, which can take the form of, for example, a printing spool. Any feedback related to the merge or validation process can be provided as indicated by the line 465 in FIG. 4. The settings, instructions, or commands embodied in the validated content processing metadata 130 can be forwarded to the process 445, as indicated by the line 470 in FIG. 4. The process 445 then renders the content 125 to the device 225 accordingly.

Figure 5:
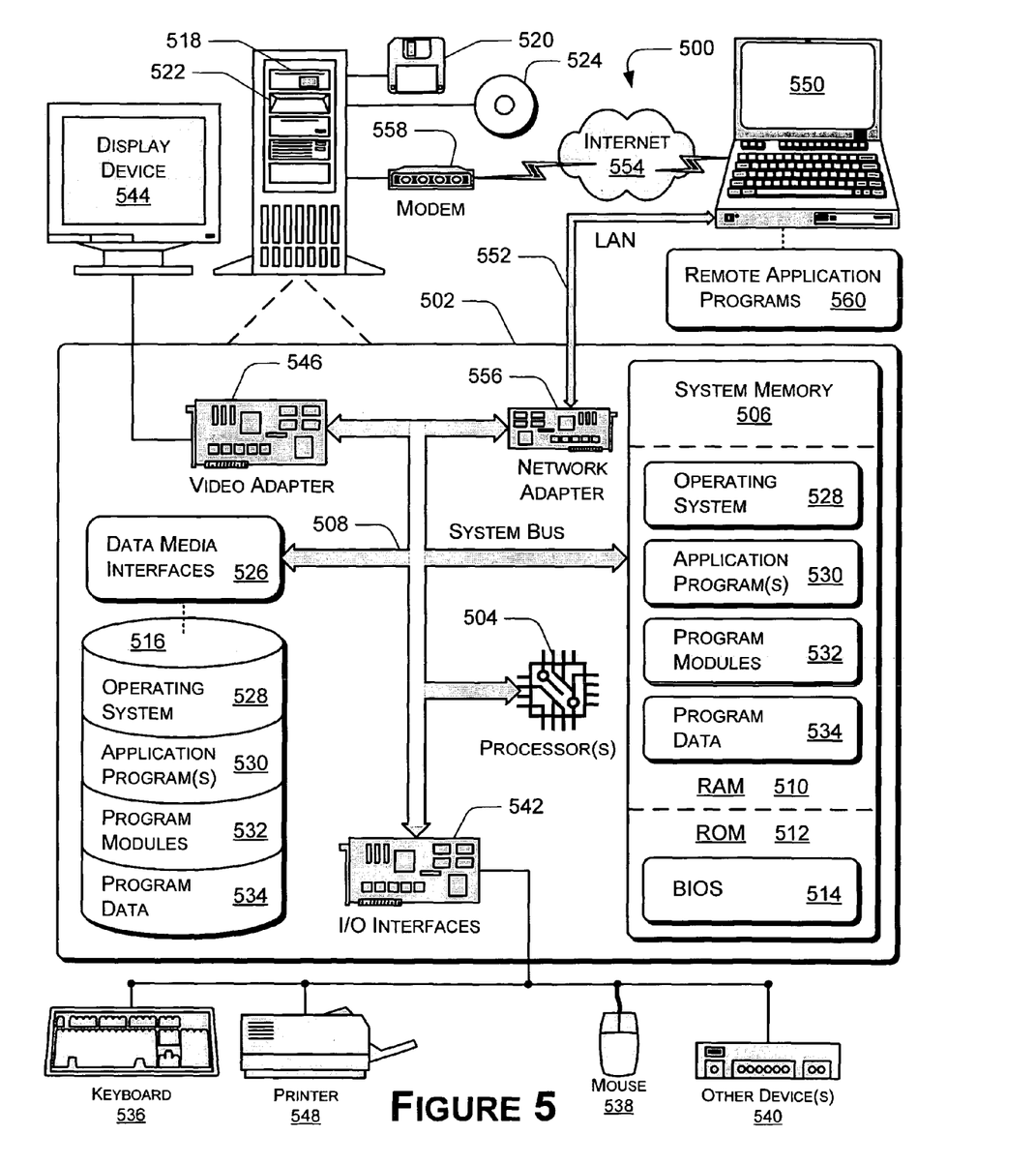
FIG. 5 illustrates an exemplary computing environment within which systems and methods for performing color management using bi-directional communication, as well as the architectures described herein, can be either fully or partially implemented.

FIG. 5 illustrates an exemplary computing environment 500 within which systems and methods for performing color management using bi-directional communication, as well as the architectures 100 and/or 200 described herein, can be either fully or partially implemented. Exemplary computing environment 500 is only one example of a computing system and is not intended to suggest any limitation as to the scope of use or functionality of the architectures. Neither should the computing environment 500 be interpreted as having any dependency or requirement relating to any one or combination of components illustrated in the exemplary computing environment 500.

The computer and network architectures in computing environment 500 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 500 includes a general-purpose computing system in the form of a computing device 502. The components of computing device 502 can include, but are not limited to, one or more processors 504 (e.g., any of microprocessors, controllers, and the like), a system memory 506, and a system bus 508 that couples the various system components. The one or more processors 504 process various computer executable instructions to control the operation of computing device 502 and to communicate with other electronic and computing devices. The system bus 508 represents any number of several types of bus structures, including a memory bus or memory controller, a peripheral bus, an accelerated graphics port, and a processor or local bus using any of a variety of bus architectures.

Computing environment 500 includes a variety of computer readable media which can be any media that is accessible by computing device 502 and includes both volatile and non-volatile media, removable and non-removable media. The system memory 506 includes computer readable media in the form of volatile memory, such as random access memory (RAM) 510, and/or non-volatile memory, such as read only memory (ROM) 512. A basic input/output system (BIOS) 514 maintains the basic routines that facilitate information transfer between components within computing device 502, such as during start-up, and is stored in ROM 512. RAM 510 typically contains data and/or program modules that are immediately accessible to and/or presently operated on by one or more of the processors 504.

Computing device 502 may include other removable/non-removable, volatile/non-volatile computer storage media. By way of example, a hard disk drive 516 reads from and writes to a non-removable, non-volatile magnetic media (not shown), a magnetic disk drive 518 reads from and writes to a removable, non-volatile magnetic disk 520 (e.g., a "floppy disk"), and an optical disk drive 522 reads from and/or writes to a removable, non-volatile optical disk 524 such as a CD-ROM, digital versatile disk (DVD), or any other type of optical media. In this example, the hard disk drive 516, magnetic disk drive 518, and optical disk drive 522 are each connected to the system bus 508 by one or more data media interfaces 526. The disk drives and associated computer readable media provide non-volatile storage of computer readable instructions, data structures, program modules, and other data for computing device 502.

Any number of program modules can be stored on RAM 510, ROM 512, hard disk 516, magnetic disk 520, and/or optical disk 524, including by way of example, an operating system 528, one or more application programs 530, other program modules 532, and program data 534. Each of such operating system 528, application program(s) 530, other program modules 532, program data 534, or any combination thereof, may include one or more embodiments of the systems and methods described herein.

Computing device 502 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 502 via any number of different input devices such as a keyboard 536 and pointing device 538 (e.g., a "mouse"). Other input devices 540 (not shown specifically) may include a microphone, joystick, game pad, controller, satellite dish, serial port, scanner, and/or the like. These and other input devices are connected to the processors 504 via input/output interfaces 542 that are coupled to the system bus 508, but may be connected by other interface and bus structures, such as a parallel port, game port, and/or a universal serial bus (USB).

A display device 544 (or other type of monitor) can be connected to the system bus 508 via an interface, such as a video adapter 546. In addition to the display device 544, other output peripheral devices can include components such as speakers (not shown) and a printer 548 which can be connected to computing device 502 via the input/output interfaces 542.

Computing device 502 can operate in a networked environment using logical connections to one or more remote computers, such as remote computing device 550. By way of example, remote computing device 550 can be a personal computer, portable computer, a server, a router, a network computer, a peer device or other common network node, and the like. The remote computing device 550 is illustrated as a portable computer that can include any number and combination of the different components, elements, and features described herein relative to computing device 502.

Logical connections between computing device 502 and the remote computing device 550 are depicted as a local area network (LAN) 552 and a general wide area network (WAN) 554. Such networking environments are commonplace in offices, enterprise-wide computer networks, intranets, and the Internet. When implemented in a LAN networking environment, the computing device 502 is connected to a local network 552 via a network interface or adapter 556. When implemented in a WAN networking environment, the computing device 502 typically includes a modem 558 or other means for establishing communications over the wide area network 554. The modem 558 can be internal or external to computing device 502, and can be connected to the system bus 508 via the input/output interfaces 542 or other appropriate mechanisms. The illustrated network connections are merely exemplary and other means of establishing communication link(s) between the computing devices 502 and 550 can be utilized.

In a networked environment, such as that illustrated with computing environment 500, program modules depicted relative to the computing device 502, or portions thereof, may be stored in a remote memory storage device. By way of example, remote application programs 560 are maintained with a memory device of remote computing device 550. For purposes of illustration, application programs and other executable program components, such as operating system 528, are illustrated herein as discrete blocks, although it is recognized that such programs and components reside at various times in different storage components of the computing device 502, and are executed by the one or more processors 504 of the computing device 502.

Although embodiments of color management using bi-directional communication have been described in language specific to structural features and/or methods, it is to be understood that the subject of the appended claims is not necessarily limited to the specific features or methods described. Rather, the specific features and methods are disclosed as exemplary implementations of color management using bi-directional communication.

What is claimed is:

1. A color management system comprising:
   a processor;
   one or more memory coupled to the processor;
   a service provider component configured to generate first metadata related to color management in response to a request, the first metadata defined as an XML schema pertaining to capabilities of a given device, wherein the XML schema comprises at least an enumerated list of processing options, the XML schema further comprising one or more child features; and
   a service requesting component configured to receive the first metadata and to generate second metadata related to color management in response thereto for processing by the service provider component, wherein the second metadata pertains to processing of a given workflow by the service provider component.

2. The color management system of claim 1, wherein the service requesting component is configured to request the first metadata by querying for capabilities of at least one device that is associated with the service provider component.

3. The color management system of claim 1, wherein the service requesting component is configured to request the first metadata by querying for print capabilities of at least one printer associated with the service provider component.

4. The color management system of claim 1, wherein the first metadata describes capabilities of at least one printer that is associated with the service provider component.

5. The color management system of claim 1, wherein the service requesting component is configured to generate second metadata that specifies that color management has been performed by the service requesting component in connection with a given workflow.

6. The color management system of claim 1, wherein the service requesting component is configured to generate second metadata that specifies that color management is to be performed by the service provider component in connection with a given workflow.

7. The color management system of claim 1, wherein the service provider component and the service requesting component are configured to perform a workflow in connection with which an image file that is associated with a first color space for display is mapped into at least a further color space for printing.

8. The color management system of claim 1, wherein the service provider component and the service requesting component are configured to perform a workflow in connection with which an image file that is associated with a Red-Green-Blue (RGB) color space for display is mapped into a Cyan-Magenta-Yellow-Black (CMYK) color space for printing.

9. The color management system of claim 1, wherein the second metadata represents color profile data that is embedded in the second metadata or is referenced by the second metadata.

10. A computer-implemented method comprising computer-executable instructions, the method comprising:
    determining, by the computer, a status of a color management operation related to a given workflow relative to an upstream component; and
    communicating the status of the color management operation and parameters for the color management operation to at least one downstream component of the upstream component in the given workflow wherein the color management operation is performed by the upstream component, wherein, the determining a status of the color management operation and communicating the status of the color management operation are performed using metadata associated with the given workflow, the metadata comprising device-capable metadata defined as an XML schema and content-processing metadata providing for a bi-directional communication between the upstream component and the downstream component.

11. The computer-implemented method of claim 10, wherein determining the status of the color management operation includes determining whether the upstream component has performed the color management operation.

12. The computer-implemented method of claim 10, wherein determining the status of the color management operation includes determining that the upstream component has performed the color management operation.

13. The computer-implemented method of claim 12, wherein communicating the status of the color management operation includes notifying at least one downstream component that the upstream component has performed the color management operation.

14. The computer-implemented method of claim 10, wherein communicating the status of the color management operation includes notifying at least one downstream component not to perform the color management operation.

15. The computer-implemented method of claim 10, wherein communicating the status of the color management operation includes notifying at least one downstream component to perform the color management operation.

16. The computer-implemented method of claim 10, further comprising querying for at least one capability of at least one device associated with at least one downstream component.

17. The computer-implemented method of claim 10, further comprising associating and retrieving data representing a color profile with the given workflow.

18. One or more computer readable memory storage devices comprising computer executable instructions that, when executed, direct a computing device to:
  determine, by the computing device, a status of a given management operation related to a given workflow relative to an upstream component, wherein the status of the given management operation comprises:
    at least one of disabling a color management in an operating system; and
    specifying that the color management be performed by a device; or
  specifying that the color management be performed by a device driver; and
  communicate the status of the given management operation to at least one further component that is downstream of the upstream component in the given workflow,
  wherein, determining the status of the given management operation and communicating the status of the given management operation are performed using metadata associated with the given workflow, the metadata comprising device-capable metadata defined as an XML schema and content-processing metadata providing for a bi-directional communication between the upstream component and a downstream component.

* * * * *